US012769462B2

(12) United States Patent
Youm et al.

(10) Patent No.: US 12,769,462 B2
(45) Date of Patent: Oct. 20, 2026

(54) MEMORY DEVICE FOR PERFORMING AN AUTHENTICATION VERIFICATION PROCESS ON DATA

(71) Applicant: Samsung Electronics Co., Ltd., Suwon-si (KR)

(72) Inventors: Yun-Ho Youm, Suwon-si (KR); Yongmin Kim, Suwon-si (KR); Jungjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/209,874

(22) Filed: May 16, 2025

(65) Prior Publication Data

US 2026/0119054 A1 Apr. 30, 2026

(30) Foreign Application Priority Data

Oct. 25, 2024 (KR) ........................ 10-2024-0147961

(51) Int. Cl.
*G06F 3/06* (2006.01)

(52) U.S. Cl.
CPC .......... *G06F 3/0622* (2013.01); *G06F 3/0637* (2013.01); *G06F 3/0679* (2013.01)

(58) Field of Classification Search
CPC ..... G06F 3/0622; G06F 3/0637; G06F 3/0679
See application file for complete search history.

(56) References Cited

U.S. PATENT DOCUMENTS

| | | | | |
|---|---|---|---|---|
| 9,942,049 | B2 | 4/2018 | McLean | |
| 11,366,767 | B2 | 6/2022 | Lee et al. | |
| 2015/0180671 | A1* | 6/2015 | Yamashita ............ | H04L 9/3242 713/168 |
| 2020/0014544 | A1* | 1/2020 | Sela ........................ | G06F 21/79 |
| 2020/0210600 | A1 | 7/2020 | Peng et al. | |
| 2022/0187997 | A1* | 6/2022 | Chu ........................ | G06F 21/44 |
| 2023/0007022 | A1 | 1/2023 | Lu et al. | |
| 2023/0077946 | A1 | 3/2023 | Kreimer et al. | |
| 2023/0113906 | A1* | 4/2023 | Montaner Mas ... | G06F 12/0866 711/163 |
| 2024/0176715 | A1 | 5/2024 | Youm et al. | |
| 2024/0202138 | A1* | 6/2024 | Kim ........................ | G06F 12/14 |
| 2024/0235806 | A9 | 7/2024 | Pillilli et al. | |
| 2024/0362370 | A1* | 10/2024 | Jain ......................... | G06F 21/72 |

FOREIGN PATENT DOCUMENTS

| | | | |
|---|---|---|---|
| CN | 111813614 | A | 10/2020 |
| CN | 113992328 | B | 8/2024 |
| KR | 10-1141346 | B1 | 5/2012 |

* cited by examiner

*Primary Examiner* — Tracy A Warren
(74) *Attorney, Agent, or Firm* — Muir Patent Law, PLLC

(57) ABSTRACT

A memory device may include a memory block and a processor. The processor may be configured to identify data, identify a standard authentication code corresponding to the data, generate a first comparison authentication code corresponding to the data using a hash key, generate a second comparison authentication code corresponding to the data using the hash key at a different time than the first comparison authentication code, and identify whether to store the data in the memory block based on at least one of the first comparison authentication code and the second comparison authentication code, and the standard authentication code.

20 Claims, 9 Drawing Sheets

FIG. 5C

| | | match1 | match2 | mismatch1 | mismatch2 | Result |
|---|---|---|---|---|---|---|
| 501 | PASS | enable | enable | disable | disable | |
| 502 | FAIL | disable | disable | enable | enable | FAIL_IRQ |
| 503 | ERROR | Handle as ERROR in all cases other than PASS/FAIL | | | | ERROR_IRQ |

MEMORY DEVICE FOR PERFORMING AN AUTHENTICATION VERIFICATION PROCESS ON DATA

CROSS-REFERENCE TO RELATED APPLICATION(S)

This application claims the benefit of Korean Patent Application No. 10-2024-0147961, filed on Oct. 25, 2024, in the Korean Intellectual Property Office, the disclosure of which is incorporated herein by reference in its entirety.

BACKGROUND

1. Field of the Invention

Example embodiments relate to a memory device for managing data and a method of operating the same.

2. Description of the Related Art

A memory device can provide storage services to a user through the process of storing and outputting data in at least one memory block. The memory device can manage data independently, or through communication with an external device (for example, a host device). The external device can provide various services to the user through communication with the memory device. For example, an external device can transfer data that is to be stored to a memory device or request data that is to be processed from the memory device.

A memory device can perform an authentication verification process on data received from an external device. For example, a memory device can perform an authentication verification process on data based on an authentication code such as a message authentication code (MAC), and when the authentication verification result satisfies a designated standard, the memory device can store the data in a memory block of the memory device. Meanwhile, in the authentication verification process, the memory device may be prevented from performing normal memory operations due to fault injection (for example, electromagnetic fault injection) for authentication verification bypass.

Therefore, by establishing a high-security authentication verification process, problems occurring in memory operations due to unexpected attacks should be prevented.

SUMMARY

The present invention provides a memory device and a method of operating the same, by which when data and a standard authentication code are identified, a plurality of comparison authentication codes corresponding to the data at different timepoints are generated, and whether to store the data in a memory block is identified based on the standard authentication code and the plurality of comparison authentication codes.

The technical tasks to be achieved by the present example embodiments are not limited to the technical tasks described above, and other technical tasks may be inferred from the following example embodiments.

According to an example embodiment, a memory device may include a memory block and a processor. The processor is configured to identify data, identify a standard authentication code corresponding to the data, generate a first comparison authentication code corresponding to the data using a hash key, generate a second comparison authentication code corresponding to the data using the hash key at a different time than the first comparison authentication code, and identify whether to store the data in the memory block based on at least one of the first comparison authentication code and the second comparison authentication code, and the standard authentication code.

According to an example embodiment, a method of managing data performed by a memory device may include identifying data, identifying a standard authentication code corresponding to the data, generating a first comparison authentication code corresponding to the data using a hash key, generating a second comparison authentication code corresponding to the data using the hash key at a different time than the first comparison authentication code, and identifying whether to store the data in a memory block of the memory device based on at least one of the first comparison authentication code and the second comparison authentication code, and the standard authentication code.

According to an example embodiment, a memory device may include a counter, a first processing device and a second processing device, a first comparison device and a second comparison device, a memory block and a processor. The processor is configured to identify data, identify a standard authentication code corresponding to the data, determine a first timepoint when a time corresponding to a first delay value has elapsed from a timepoint at which the data or the standard authentication code is identified, determine a second timepoint when a time corresponding to a second delay value has elapsed from the timepoint at which the data or the standard authentication code is identified, generate a first comparison authentication code corresponding to the data at the first timepoint based on the first delay value using the first processing device, generate a second comparison authentication code corresponding to the data at the second timepoint based on the second delay value using the second processing device, identify a first comparison result between the first comparison authentication code and the standard authentication code at a third timepoint that is after the first timepoint using the first comparison device, identify a second comparison result between the second comparison authentication code and the standard authentication code at a fourth timepoint that is after the second timepoint using the second comparison device, and identify whether to store the data in the memory block based on the first comparison result and the first comparison result. The first comparison authentication code and the second comparison authentication code are generated based on at least one of the data, a hash key and a count value of the number of times of data storage that is identified by the counter.

BRIEF DESCRIPTION OF THE FIGURES

These and/or other aspects, features, and advantages of the invention will become apparent and more readily appreciated from the following description of example embodiments, taken in conjunction with the accompanying drawings of which:

FIG. 5C is a drawing for explaining the operation of a memory device according to an example embodiment;

DETAILED DESCRIPTION

Terms used in the example embodiments are selected from currently widely used general terms when possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as ". . . unit," ". . . group," and ". . . module" described in the specification mean a unit that processes at least one function or operation, which may be implemented as hardware, software, or a combination thereof.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Figure 1:
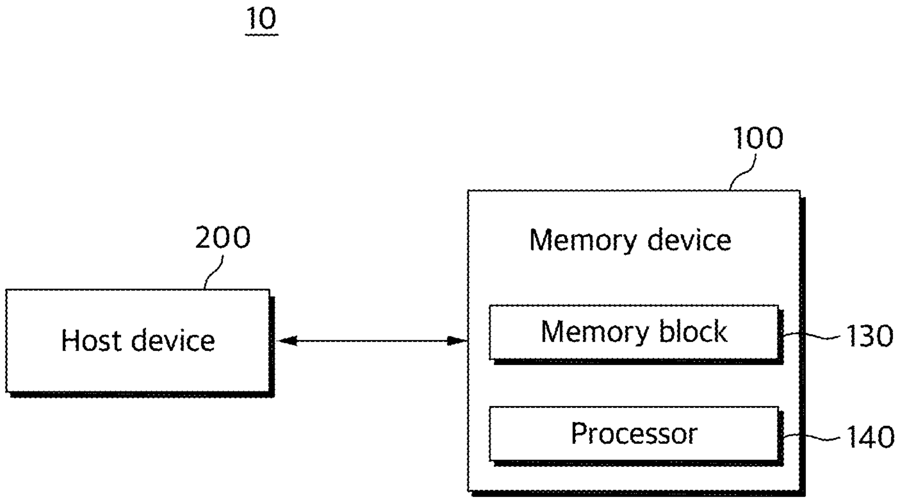
FIG. 1 is a drawing for explaining a system including a memory device and a host device according to an example embodiment.

FIG. 1 is a drawing for explaining a system including a memory device and a host device according to an example embodiment.

Referring to FIG. 1, a system (or, a data management system) 10 according to an example embodiment of the present disclosure may include a memory device 100 (or, a storage device) and a host device 200. The memory device 100 and the host device 200 may exchange various data through a communication channel. The memory device 100 and the host device 200 may be contained in one device and physically separated.

In an example embodiment, the memory device 100 may include a memory block 130 and a processor 140. The memory device 100 may include an embedded multi media card (eMMC) or universal flash storage (UFS).

The memory block 130 may store instructions or data. For example, the memory block 130 may store data managed by the memory device 100. For example, the memory block 130 may store at least some of the data received from the host device 200.

The memory block 130 may store various information related to the operation of the memory device 100. For example, the memory block 130 may store information about the operation history, operation parameters, performance, and so on of the memory device 100. For example, the memory block 130 may contain a replay protected memory block (RPMB).

The memory block 130 may be coupled to the processor 140, and the processor 140 may read information from or write information to a storage medium included in the memory block 130. For example, the memory block 130 and the processor 140 may be implemented as individual components or integrated as a single module.

The processor 140 (or a memory controller) may be operationally connected to the memory block 130. For example, the processor 140 may store (or write) data to the memory block 130, or decode (or read) data stored in the memory block 130.

The processor 140 may identify data and a standard authentication code corresponding to the data. The host device 200 may generate the standard authentication code corresponding to the data. The processor 140 may generate at least one comparison authentication code corresponding to the data, and identify whether to store the data in the memory block 130 based on at least one comparison authentication code and the standard authentication code.

In an example embodiment, the host device 200 may store data in the memory device 100, or process data stored in the memory device 100. The host device 200 may control the operation of at least some of the components included in the memory device 100. The host device 200 may include a processor (for example, application processor and so on) contained in a single electronic device together with the memory device 100.

The components illustrated as included in the memory device 100 in FIG. 1 are exemplary, and thus the example embodiments are not limited thereto. For example, the memory device 100 may further include components (for example, a counter, at least one processing device, at least one comparison device and so on) not illustrated in FIG. 1.

Figure 2:
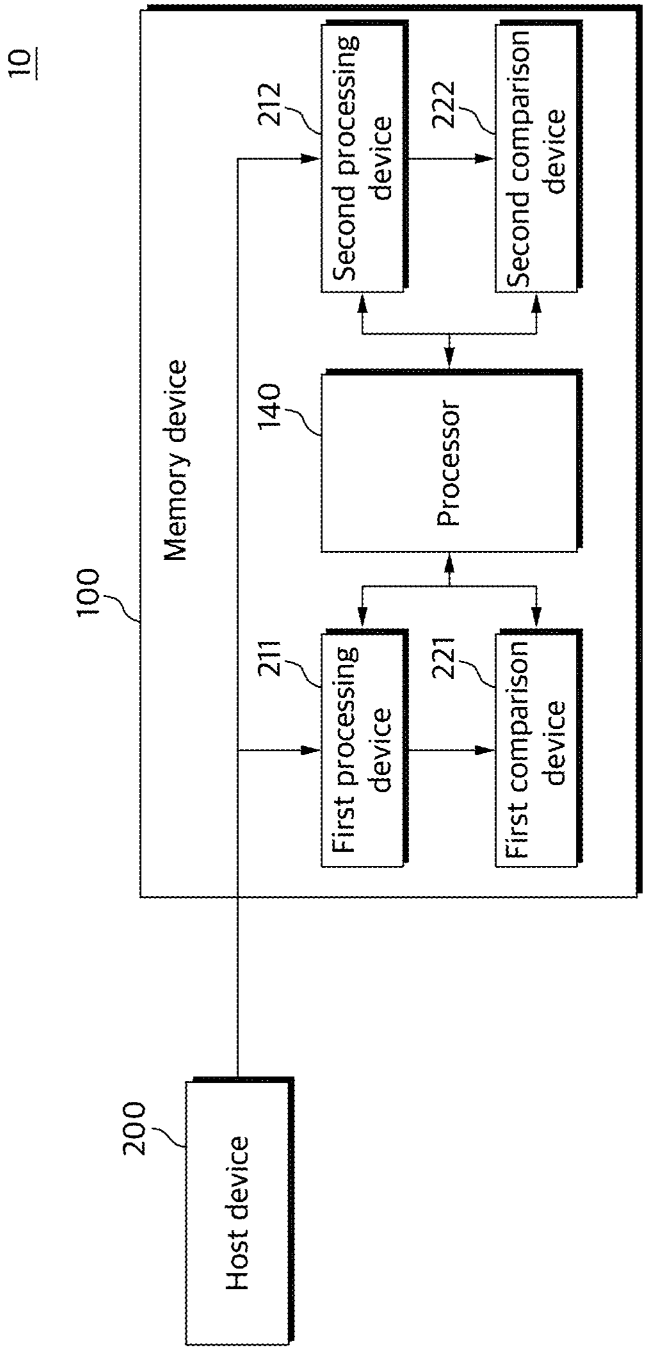
FIG. 2 is a drawing for explaining a system including a memory device and a host device according to an example embodiment.

FIG. 2 is a drawing for explaining a system including a memory device and a host device according to an example embodiment.

Referring to FIG. 2, the system (or, the data management system) 10 may include and the host 200. The memory device 100 may identify various information transmitted through communication with the host device 200. The memory device 100 may identify whether to store the data in a memory block based on the components (for example, the processor 140, a first processing device 211, a second processing device 212, a first comparison device 221 and a second comparison device 222) illustrated in FIG. 2. The division of components of the memory device 100 illustrated in FIG. 2 may correspond to a logical division, and at least some of the operations described as being performed by the components may be operations performed by a single device (for example, the processor 140).

In an example embodiment, the memory device 100 may identify data.

The memory device 100 may identify data received from the host device 200. The host device 200 may transfer data to the memory device 100 for storage in the memory block 130 contained in the memory device 100.

In an example embodiment, the memory device 100 may identify the standard authentication code corresponding to the data.

For example, the memory device 100 may identify the standard authentication code corresponding to the data received from the host device 200.

In an example embodiment, the memory device 100 may identify or generate a first comparison authentication code and a second comparison authentication code corresponding to the data.

For example, the memory device 100 may generate the first comparison authentication code using the first processing device 211, and generate the second comparison authentication code using the second processing device 212.

The memory device 100 may identify or generate the first comparison authentication code at a first timepoint based on a first delay value, and identify or generate the second comparison authentication code at a second timepoint based on a second delay value. For example, the memory device 100 may identify or generate the first comparison authentication code at the first timepoint when the time corresponding to the first delay value has elapsed from the timepoint at which the standard authentication code was identified or generated. The first timepoint may be the timepoint at which the memory device 100 begins identifying or generating the first comparison authentication code using the first processing device 211. For example, the memory device 100 may identify or generate the second comparison authentication code at the second timepoint when the time corresponding to the second delay value has elapsed from the timepoint at which the standard authentication code was identified or generated. The second timepoint may be the timepoint when the memory device 100 starts identifying or generating the second comparison authentication code using the second processing device 212. For example, the first delay value may be different from the second delay value. For example, the difference between the time corresponding to the first delay value and the time corresponding to the second delay value may be less than or equal to a specified difference (for example, 100 ns).

The memory device 100 may identify or determine a range of delay values based on the operating performance of the memory device 100, and identify or determine the first delay value and the second delay value within the identified or determined range. For example, based on the clock frequency (clock frequency) or clock speed of the memory device 100, the memory device 100 may identify or determine the range of delay values that is set in order for the difference between the time corresponding to the first delay value and the time corresponding to the second delay value to become less than or equal to the specified difference.

The memory device 100 may identify or generate the first comparison authentication code and the second comparison authentication code based on at least one of data, a hash key and a count value regarding the number of times of data storage. For example, the hash key corresponds to an algorithm key that is input as the key data of a hash function together with the data to verify the data, and the hash key may be the same as the hash key that the host device 200 used to generate the standard authentication code. For example, the count value may be the number of times data was stored in the memory block 130 by the host device 200. The memory device 100 may update the count value using a counter. For example, the first comparison authentication code and the second comparison authentication code may include the storage address and identification information of the data. The memory device 100 may store data in the memory block 130 based on the storage address of the data. The memory device 100 may identify a packet corresponding to the data based on the identification information.

In an example embodiment, the memory device 100 may identify whether to store data in the memory block 130 based on at least one of the first comparison authentication code and the second comparison authentication code, and the standard authentication code.

The memory device 100 may identify whether to store the data in the memory block 130 based on the first delay value corresponding to the first comparison authentication code and the second delay value corresponding to the second comparison authentication code.

The memory device 100 may identify a first comparison result between the first comparison authentication code and the standard authentication code at a third timepoint after the first timepoint, and identify a second comparison result between the second comparison authentication code and the standard authentication code at a fourth timepoint after the second timepoint. For example, the difference between the first timepoint and the third timepoint may be a first period of time consumed by the first processing device 211 to identify or generate the first comparison authentication code. For example, the difference between the second timepoint and the fourth timepoint may be a second period of time consumed by the second processing device 212 to identify or generate the second comparison authentication code. For example, the first period of time and the second period of time may be substantially identical. For example, the third timepoint may be different from the fourth timepoint.

Figure 3:
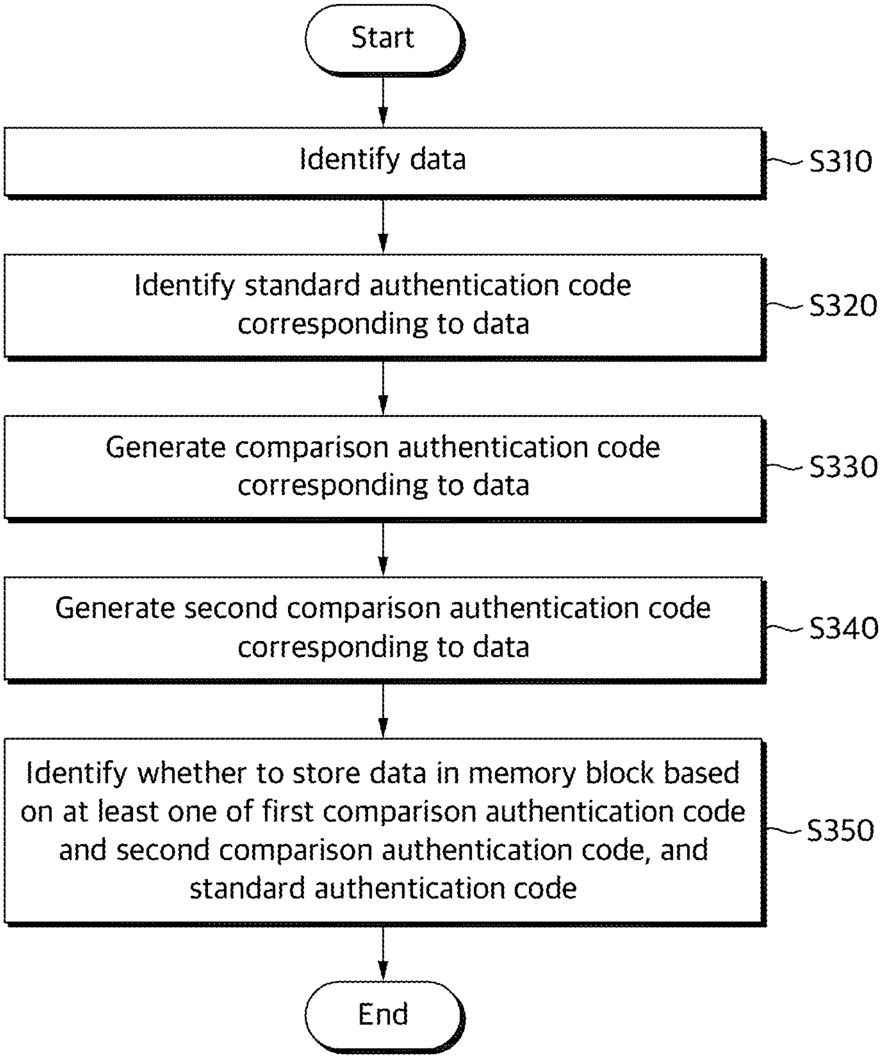
FIG. 3 is an operational flowchart for explaining an operating method of a memory device according to an example embodiment.

FIG. 3 is an operational flowchart for explaining an operating method of a memory device according to an example embodiment.

According to an example embodiment, the memory device 100 may perform the operations disclosed with reference to FIG. 3. For example, components included in the memory device 100 (for example, at least some of the memory block 130, the processor 140 and so on of FIG. 1) may be configured to perform the operations of FIG. 3.

In the following example embodiments, operations S310, S320, S330, S340 and S350 may be performed sequentially, but are not necessarily performed sequentially. For example, the order of each operation may be changed, and at least two operations may be performed in parallel. Further, any content that corresponds to or overlaps with the above-described content with respect to FIG. 3 may be briefly explained or omitted.

According to an example embodiment, the memory device 100 may identify data in operation S310.

For example, the memory device 100 may identify data received from the host device 200.

According to an example embodiment, the memory device 100 may identify a standard authentication code corresponding to the data in operation S320.

For example, the memory device 100 may receive a standard authentication code generated from the host device 200 using the data.

For example, the standard authentication code may include a message authentication code (MAC) corresponding to the data. For example, the standard authentication code may contain information generated from the host device 200 based on at least one of the data, a hash key, and a count value for the number of times of data storage. For example, the standard authentication code may include the storage address and identification information of the data.

According to an example embodiment, the memory device 100 may identify or generate a first comparison authentication code corresponding to the data in operation S330.

According to an example embodiment, the memory device 100 may identify or generate a second comparison authentication code corresponding to the data in operation S340.

For example, the memory device 100 may identify or generate the first comparison authentication code and the second comparison authentication code based on the same hash key as the hash key stored in the host device 200 and the data. In other words, the memory device 100 may identify or generate the first comparison authentication code and the second comparison authentication code using a hash key based on a symmetric-key algorithm.

For example, the memory device 100 may start identifying or generating the first comparison authentication code and the second comparison authentication code at different timepoints.

According to an example embodiment, the memory device 100 may identify whether to store the data in the memory block 130 based on at least one of the first comparison authentication code and the second comparison authentication code, and the standard authentication code in operation S350.

For example, the memory device 100 may identify a first comparison result between the first comparison authentication code and the standard authentication code, and a second comparison result between the second comparison authentication code and standard authentication code. The memory device 100 may identify whether to store the data in the memory block 130 based on whether the first comparison result and the second comparison result satisfy the designated standard. The memory device 100 may identify that the first comparison result satisfies a designated standard when the first comparison authentication code and the standard authentication code contain the same information. The memory device 100 may identify that the first comparison result does not satisfy the designated standard when at least some of the information contained in the first comparison authentication code is different from the information contained in the standard authentication code.

For example, when both the first comparison result and the second comparison result satisfy the designated standard, the memory device 100 may store the data in the memory block 130. The memory device 100 may store the data in a designated address of the memory block 130, which is identified based on the storage address included in the standard authentication code.

For example, when both the first comparison result and the second comparison result do not satisfy the designated standard, the memory device 100 may not store the data in the memory block 130. The memory device 100 may transmit information about the first comparison result and the second comparison result to the host device 200. For example, to the host device 200, the memory device 100 may transmit information about the comparison result between each of the first comparison authentication code and the second comparison authentication code, and the standard authentication code, and information about whether the data is stored.

For example, when either the first comparison result or the second comparison result satisfies the designated standard, the memory device 100 may perform a response policy regarding authentication error. The response policy may contain user-defined operations.

In this case, in an example embodiment, the memory device 100 may suspend operation of the memory device 100 or initialize the memory device 100.

In this case, in an example embodiment, the memory device 100 may identify or generate at least one additional comparison authentication code based on at least one additional delay value different from the first delay value and the second delay value. The memory device 100 may identify again whether to store the data in the memory block 130 based on the comparison result between at least one additional comparison authentication code and an additional standard authentication code. For example, the memory device 100 may receive the additional standard authentication code generated from the host device 200 using the additional data. In this case, the memory device 100 may identify an arbitrary additional delay value that is different from the first delay value and the second delay value within the specified range identified based on the operating performance of the memory device 100.

Even though not illustrated in FIG. 3, when the additional data is identified, the memory device 100 may identify whether the additional data is to be stored in the memory block 130 based on the additional standard authentication code and a new comparison authentication code.

For example, when the additional data and the additional standard authentication code are identified, the memory device 100 may identify or generate a third comparison authentication code and a fourth comparison authentication code corresponding to the additional data. The memory device 100 may identify or determine a third delay value and a fourth delay value that are arbitrarily determined within a range that corresponds to each of the third comparison authentication code and the fourth comparison authentication code. For example, the memory device 100 may generate the third comparison authentication code at a fifth timepoint based on the third delay value, and generate the fourth comparison authentication code at a sixth timepoint based on fourth delay value. For example, the memory device 100 may generate the third comparison authentication code at the fifth timepoint when the time corresponding to the third delay value has elapsed from the timepoint at which the additional data or the additional standard authentication code was identified. For example, the memory device 100 may generate the fourth comparison authentication code at the sixth timepoint when the time corresponding to the fourth delay value has elapsed from the timepoint at which the additional data or the additional standard authentication code was identified. The memory device 100 may identify whether to store the additional data in the memory block 130 based on at least one of the third comparison authentication code, the fourth comparison authentication code, the third delay value and the fourth delay value. At least one of the third delay value and the fourth delay value may be different from the first delay value and the second delay value. The memory device 100 may identify whether to store the additional data in the memory block 130 based on whether a third comparison result between the third comparison authentication code and the additional standard authentication code and a fourth comparison result between the fourth comparison authentication code and the additional standard authentication code satisfy the designed standard.

Figure 4:
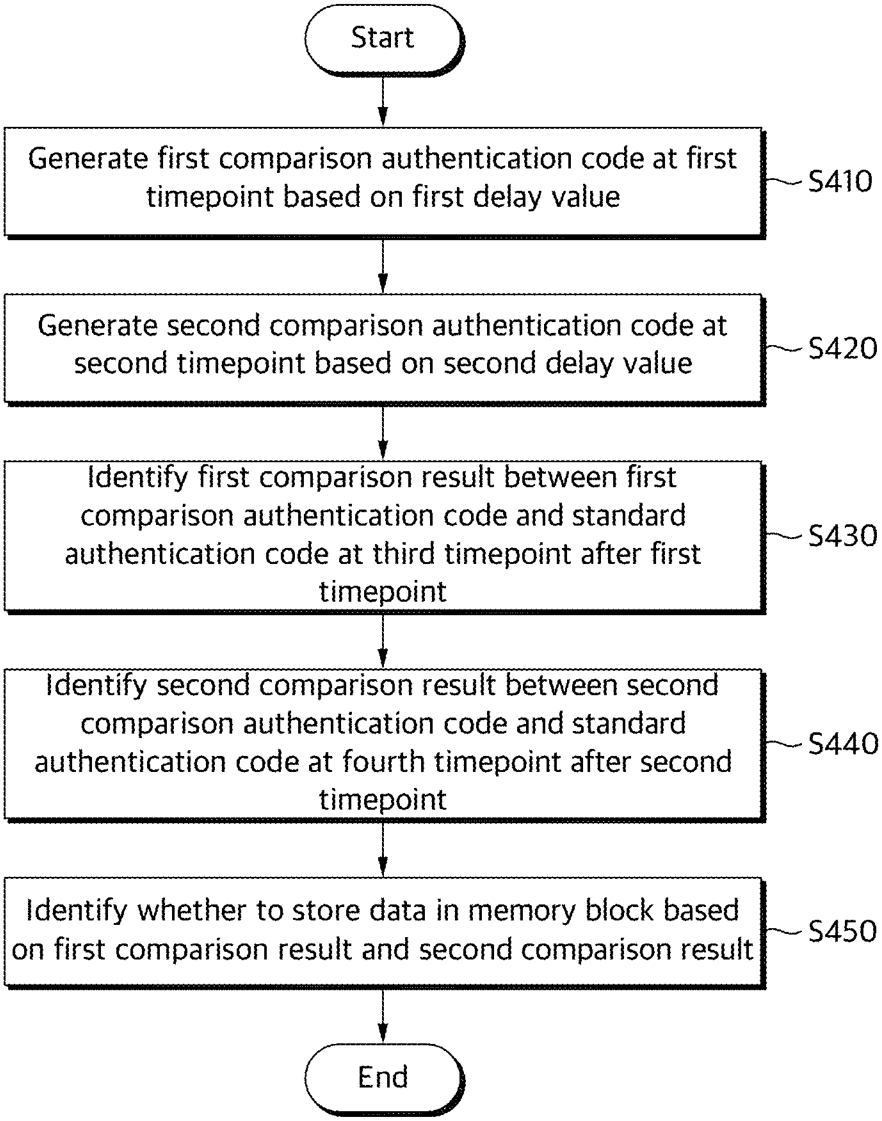
FIG. 4 is an operational flowchart for explaining an operating method of a memory device according to an example embodiment.

FIG. 4 is an operational flowchart for explaining an operating method of a memory device according to an example embodiment.

According to an example embodiment, the memory device 100 may perform the operations disclosed with reference to FIG. 4. For example, components included in the memory device 100 (for example, at least some of the memory block 130, the processor 140 and so on of FIG. 1) may be configured to perform the operations of FIG. 4.

In the following example embodiments, operation S410, S420, S430, S440 and S450 may be performed sequentially, but are not necessarily performed sequentially. For example, the order of each operation may be changed, and at least two operations may be performed in parallel. Further, any content that corresponds to or overlaps with the above-described content with respect to FIG. 4 may be briefly explained or omitted.

According to an example embodiment, the memory device 100 may identify or generate the first comparison authentication code at the first timepoint based on the first delay value in operation S410.

According to an example embodiment, the memory device 100 may identify or generate the second comparison authentication code at the second timepoint based on the second delay value in operation S420.

Based on the operating performance (for example, the clock frequency or the clock speed) of the memory device 100, the memory device 100 may identify or determine the range of delay values that is set in order for the difference between a first period of time corresponding to the first delay value and a second period of time corresponding to the second delay value to become less than or equal to a specified time (for example, 100 ns). The memory device 100 may identify or determine any first delay value and second delay value within the identified range.

For example, the memory device 100 may identify or generate the first comparison authentication code by using the first processing device 211 at the first timepoint that is the time the first period of time corresponding to the first delay value has been elapsed from the timepoint where the data was identified or the timepoint where the standard authentication code was identified.

For example, the memory device 100 may identify or generate the second comparison authentication code by using the second processing device 212 at the second timepoint that is the time the second period of time corresponding to the second delay value has been elapsed from the timepoint where the data was identified or the timepoint where the standard authentication code was identified.

According to an example embodiment, the memory device 100 may identify the first comparison result between the first comparison authentication code and the standard authentication code at the third timepoint after the first timepoint in operation S430.

According to an example embodiment, the memory device 100 may identify the second comparison result between the second comparison authentication code and the standard authentication code at the fourth timepoint after the second timepoint in operation S440.

For example, the memory device 100 may identify the first comparison result between first comparison authentication code and standard authentication code using the first processing device 211 at the third timepoint. The difference between the first timepoint and the third timepoint may be the time consumed by the first processing device 211 to identify the first comparison authentication code.

For example, the memory device 100 may identify the second comparison result between second comparison authentication code and standard authentication code using the second processing device 212 at the fourth timepoint. The difference between the second timepoint and the fourth timepoint may be the time consumed by the second processing device 212 to identify the second comparison authentication code.

According to an example embodiment, the memory device 100 may identify whether to store the data in a memory block based on the first comparison result and the second comparison result in operation S450.

For example, the memory device 100 may identify whether the first comparison result and the second comparison result satisfy the designated standard.

For example, the memory device 100 may determine that the first comparison result satisfies the designated standard when the first comparison authentication code and the standard authentication code contain the same information. For example, the memory device 100 may determine that the first comparison result does not satisfy the designated standard when at least some of the information contained in the first comparison authentication code is different from the information contained in the standard authentication code.

For example, the memory device 100 may determine that the second comparison result satisfies the designated standard when the second comparison authentication code and the standard authentication code contain the same information. For example, the memory device 100 may determine that the second comparison result does not satisfy the designated standard when at least some of the information contained in the second comparison authentication code is different from the information contained in the standard authentication code.

For example, description on the process by which the memory device 100 identifies whether to store the data in the memory block 130 may be replaced with the description of operation S350 of FIG. 3 described above.

Figure 5A:
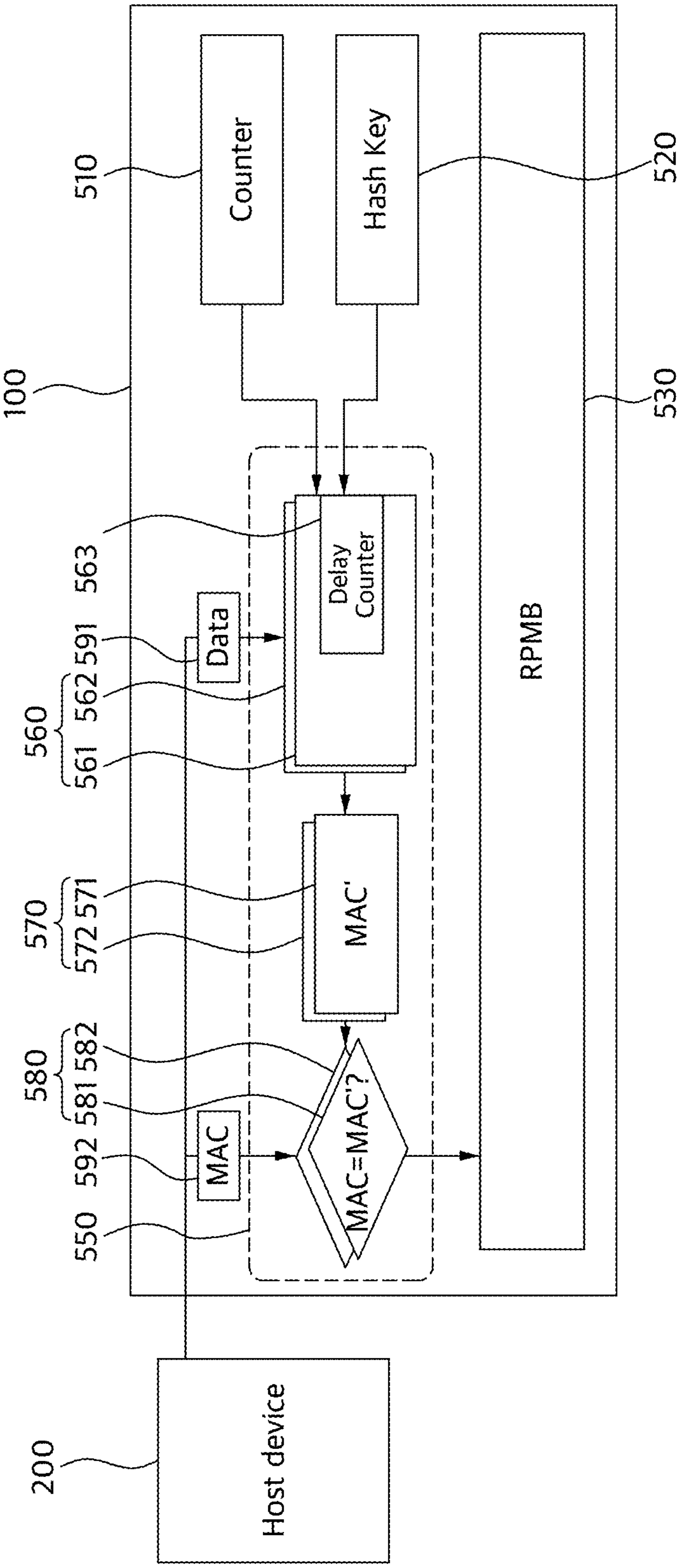
FIG. 5A is a drawing for explaining the operation of a memory device according to an example embodiment.

FIG. 5A is a drawing for explaining the operation of a memory device according to an example embodiment.

Figure 5B:
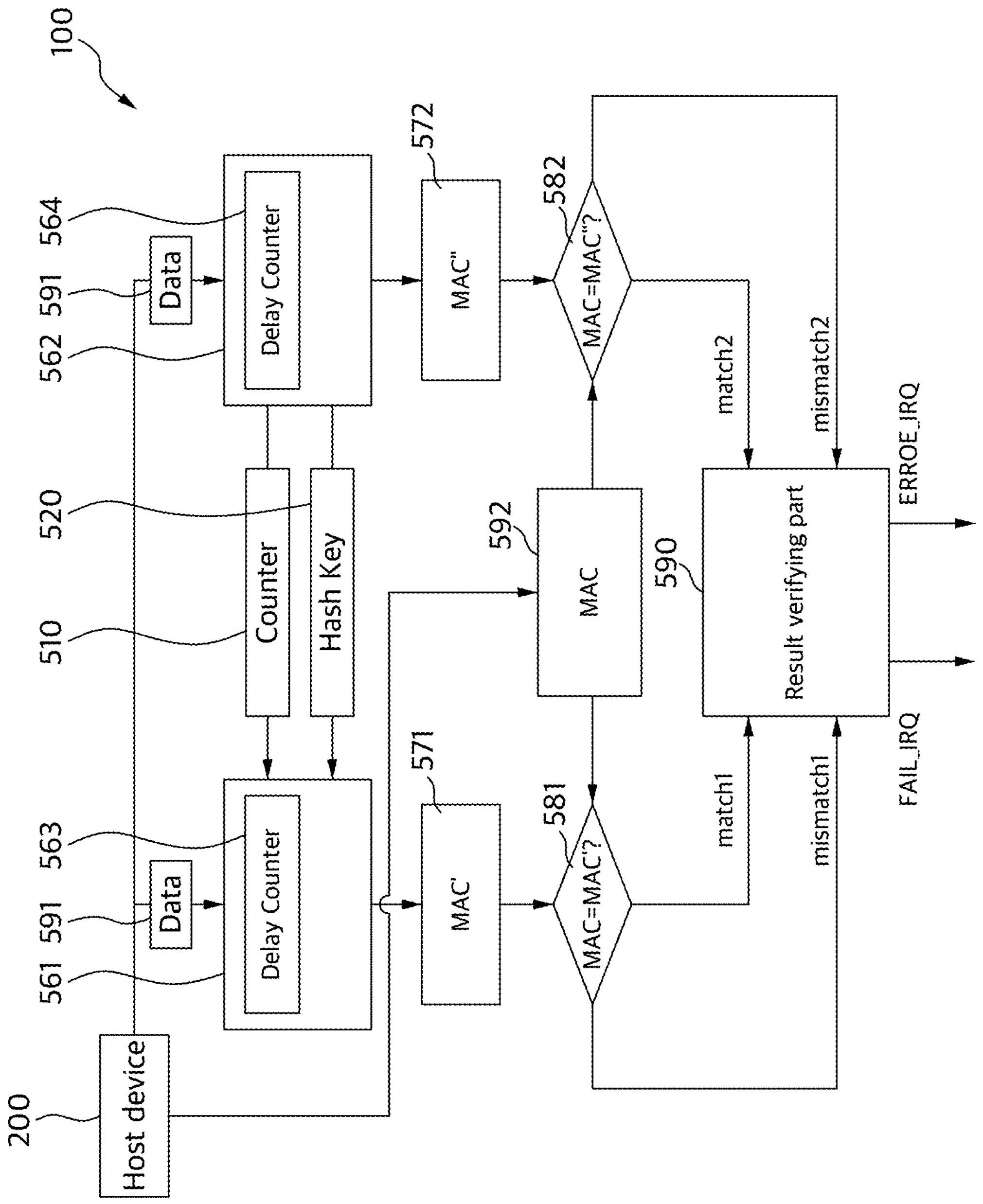
FIG. 5B is a drawing for explaining the operation of a memory device according to an example embodiment.

FIG. 5B is a drawing for explaining the operation of a memory device according to an example embodiment.

Referring to FIG. 5A and FIG. 5B, the memory device 100 includes a plurality of logically distinct components, and at least some of the operations performed by the illustrated components may be performed by a device (for example, the processor 140 of FIG. 1).

According to an example embodiment, the memory device 100 may include a counter 510, a hash key 520, an RPMB 530 (or, the memory block 130 of FIG. 1), and an authentication verifying device 550. The memory device 100 may identify data 591 and a MAC 592 (or a standard authentication code) received from the host device 200.

For example, the counter 510 may identify the count value for the number of times of data storage. When the data 591 received from the host device 200 is stored in the RPMB 530, the counter 510 may increase the count value.

For example, the hash key 520 may be stored in the host device 200, and the hash key 520 may be the same as the algorithm key that the host device 200 uses to generate the standard authentication code. For example, the memory device 100 may identify or generate the first comparison authentication code and second comparison authentication code using the hash key 520 based on the symmetric-key algorithm.

For example, the RPMB 530 may contain at least one partition for storing the data. The RPMB 530 may include secure storage that manages data based on authentication verification and the replay protection access.

For example, the authentication verifying device 550 may include at least one processing device 560 and at least one comparison device 580.

The at least one processing device 560 may include a first processing device 561 and a second processing device 562. The first processing device 561 may include a first delay counter 563, and the second processing device 562 may include a second delay counter 564.

The memory device 100 may generate at least one comparison authentication code 570 based on at least one of the data 591, a count value with respect to the number of times of data storage identified by the counter 510, and the hash key 520. For example, the at least one comparison authentication code 570 may include a first comparison authentication code 571 (for example, MAC') and a second comparison authentication code 572 (for example, MAC"). For example, the memory device 100 may identify or generate the first comparison authentication code 571 and the second comparison authentication code 572 using the first processing device 561 and the second processing device 562, respectively.

At least one comparison device 580 may include a first comparison device 581 that identifies a first comparison result between the first comparison authentication code 571 and the MAC 592, and a second comparison device 582 that identifies a second comparison result between the second comparison authentication code 572 and the MAC 592.

The memory device 100 may identify the data 591 and the MAC 592 corresponding to the data 591. The data 591 and the MAC 592 may be received from the host device 200. The MAC 592 may be a standard authentication code generated from the host device 200 based on the data 591.

The memory device 100 may identify or generate the first comparison authentication code 571 at the first timepoint corresponding to the first delay value identified through the first delay counter 563, and identify or generate the second comparison authentication code 572 at the second timepoint corresponding to the second delay value identified through the second delay counter 564.

The memory device 100 may use the first comparison device 581 to identify the first comparison result between the first comparison authentication code 571 and the MAC 592, and use the second comparison device 582 to identify the second comparison result between the second comparison authentication code 572 and the MAC 592.

The memory device 100 may include a result verifying part 590 configured to identify whether the first comparison result and the second comparison result satisfy the designated standard, generate information based on the identified result, and transmit the information to the host device 200.

For example, when the first comparison result and the second comparison result satisfy the designated standard, the memory device 100 may transmit a signal match1 and a signal match2 to the result verifying part 590, respectively.

For example, when the first comparison result and the second comparison result do not satisfy the designated standard, the memory device 100 may transmit a signal mismatch1 and a signal mismatch2 to the result verifying part 590, respectively.

Below, operations of the memory device 100 according to the result identified by the result verifying part 590 are described in detail with reference to FIG. 5C.

FIG. 5C is a drawing for explaining the operation of a memory device according to an example embodiment.

Referring to reference numeral 501, according to an example embodiment, when both the first comparison result and the second comparison result satisfy the designated standard, the memory device 100 may use the result verifying part 590 to identify first information indicating a PASS state. When both the signal match1 and the signal match2 are enabled in the result verifying part 590, the memory device 100 may determine that both the first comparison result and the second comparison result satisfy the designated standard. The memory device 100 may transmit the first information to the host device 200, and based on obtaining a control command corresponding to the first information from the host device 200, the memory device 100 may store the data 591 in the memory block 130.

Referring to reference numeral 502, according to an example embodiment, when both the first comparison result and the second comparison result do not satisfy the designated standard, the memory device 100 may use the result verifying part 590 to identify second information (for example, FAIL_IRQ) indicating a FAIL state. The memory device 100 may transmit the second information to the host device 200, and based on obtaining a control command corresponding to the second information from the host device 200, the memory device 100 may not store the data 591 in the memory block 130.

Referring to reference numeral 503, according to an example embodiment, when it is neither a PASS state nor a FAIL state, the memory device 100 may use the result verifying part 590 to identify third information (for example, ERROR_IRQ) indicating an ERROR state. For example, the memory device 100 may identify the third information when only one of the first comparison result and the second comparison result satisfies the designated standard. The memory device 100 may transmit the third information to the host device 200, and based on obtaining a control command corresponding to the third information from the host device 200, the memory device 100 may perform a response policy regarding authentication errors.

For example, the memory device 100 may suspend the operation of the memory device 100 or initialize the memory device 100 based on obtaining the control command corresponding to the third information.

In this case, the memory device 100 may identify or generate at least one additional comparison authentication code using the data 591 (i.e., additional data), a count value and the hash key 520, and the memory device 100 may identify or determine at least one additional delay value corresponding to at least one additional comparison authentication code. The memory device 100 may identify again whether to store the data 591 in the memory block 130 based on the at least one additional comparison authentication code, the at least one additional delay value and the MAC 592. The operation of identifying whether to store the additional data via the additional comparison authentication code may include the same algorithm as the operation of identifying whether to store data via the first comparison authentication code and the second comparison authentication code.

In the above-described example embodiments, it is described that the memory device 100 stores the data 591 in the memory block 130 or executes a response policy based on the control command obtained from the host device 200, but the present invention is not limited thereto. For example, the memory device 100 may perform the operations described above on its own based on the results identified through the result verifying part 590.

Figure 6:
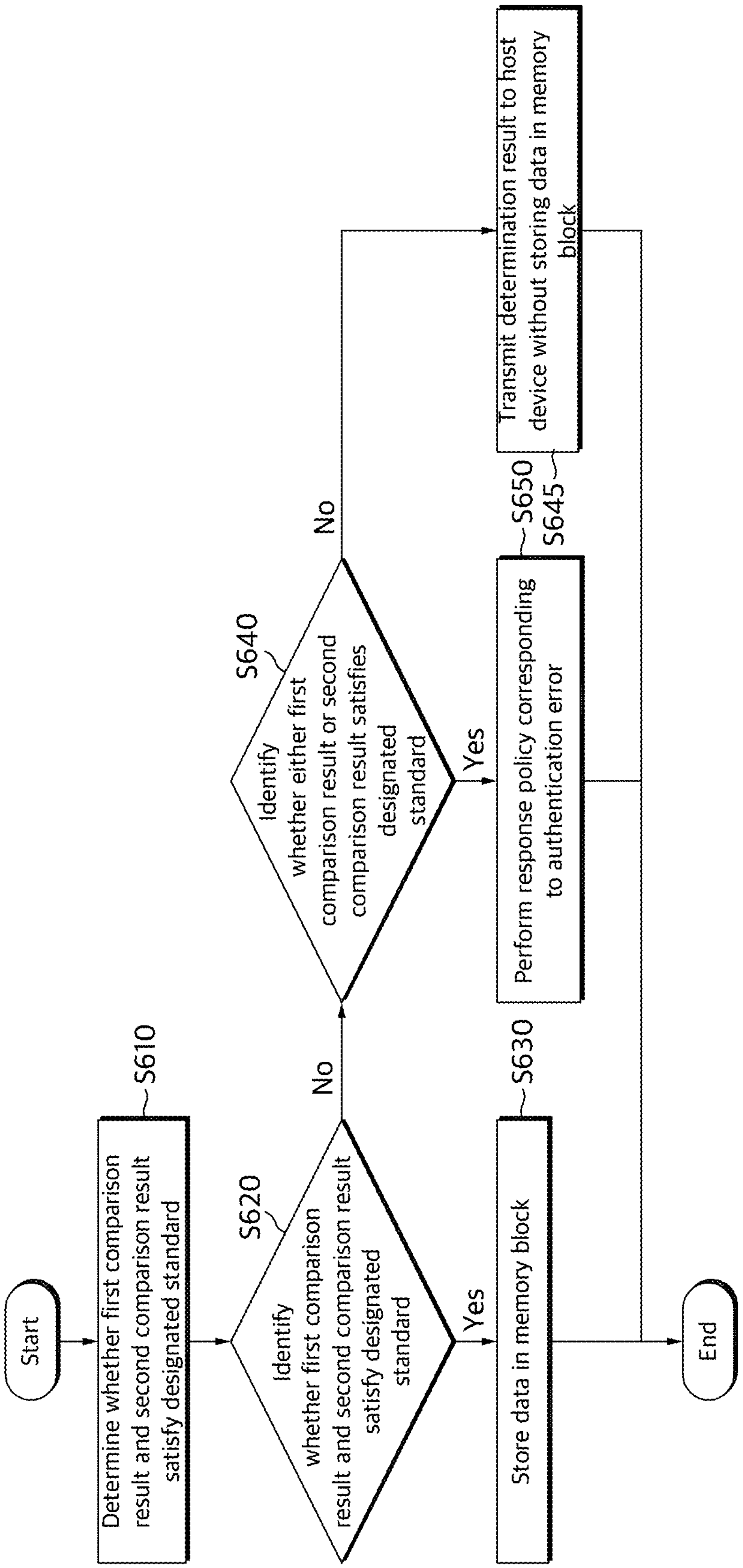
FIG. 6 is an operational flowchart for explaining an operating method of a memory device according to an example embodiment.

FIG. 6 is an operational flowchart for explaining an operating method of a memory device according to an example embodiment.

According to an example embodiment, the memory device 100 may perform the operations disclosed in FIG. 6. For example, components included in the memory device 100 (for example, at least some of the memory block 130, the processor 140 and so on of FIG. 1) may be configured to perform the operations of FIG. 6.

In the following example embodiments, operation S610, S620, S630, S640, S645 and S650 may be performed sequentially, but the operations are not necessarily performed sequentially. For example, the order of each operation may be changed, and at least two operations may be performed in parallel. Further, any content that corresponds to or overlaps with the above-described content with respect to FIG. 6 may be briefly explained or omitted.

According to an example embodiment, the memory device 100 may determine whether the first comparison result and the second comparison result satisfy the designated standard in operation S610.

For example, the memory device 100 may identify the first comparison result between the first comparison authentication code and the standard authentication code, and the second comparison result between the second comparison authentication code and standard authentication code.

For example, the memory device 100 may determine whether the designated standard is satisfied based on the degree of correspondence between the information contained in the comparison authentication code and the information contained in the standard authentication code. The memory device 100 may determine that the comparison result satisfies the designated standard when the match rate between the information contained in the comparison authentication code and the information contained in the standard authentication code exceeds the specified value.

According to an example embodiment, the memory device 100 may identify whether the first comparison result and the second comparison result satisfy the designated standard in operation S620.

For example, when both the first comparison result and the second comparison result satisfy the designated standard (for example, operation S620—Yes), the memory device 100 may perform operation S630.

For example, when at least one of the first comparison result and the second comparison result does not satisfy the designated standard (for example, operation S620—No), the memory device 100 may perform operation S640.

According to an example embodiment, the memory device 100 may store the data in the memory block 130 in operation S630.

For example, the memory device 100 may transmit the first information that both the first comparison result and the second comparison result satisfy the designated standard to the host device 200. The memory device 100 may store the data in the memory block 130 based on obtaining a control command corresponding to the first information from the host device 200.

According to an example embodiment, the memory device 100 may identify whether either the first comparison result or the second comparison result satisfies the designated standard in operation S640.

For example, when either the first comparison result or the second comparison result satisfies the designated standard (for example, operation S640—Yes), the memory device 100 may perform operation S650.

For example, when both the first comparison result and the second comparison result do not satisfy the designated standard (for example, operation S640—No), the memory device 100 may perform operation S645.

According to an example embodiment, the memory device 100 may perform a response policy corresponding to authentication error in operation S650.

For example, the memory device 100 may identify that the authentication verification result of data is in the state according to reference numeral 503 of FIG. 5C described above, and perform a predefined operation in response to the authentication error.

For example, the memory device 100 may transmit to the host device 200 the third information that only one of the first comparison result and the second comparison result satisfies the designated standard. The memory device 100 may perform at least some of operations of the response policy corresponding to a control command based on obtaining the control command corresponding to the third information from the host device 200.

For example, the description of the response policy corresponding to the authentication error may be replaced with the description of the reference numeral 503 of FIG. 5C described above.

According to an example embodiment, the memory device 100 may transmit the determination result to the host device 200 without storing the data in the memory block 130 in operation S645.

For example, the memory device 100 may not store the data in the memory block 130, and transmit to the host device 200 the second information that both the first comparison result and the second comparison result do not satisfy the designated standard.

Figure 7:
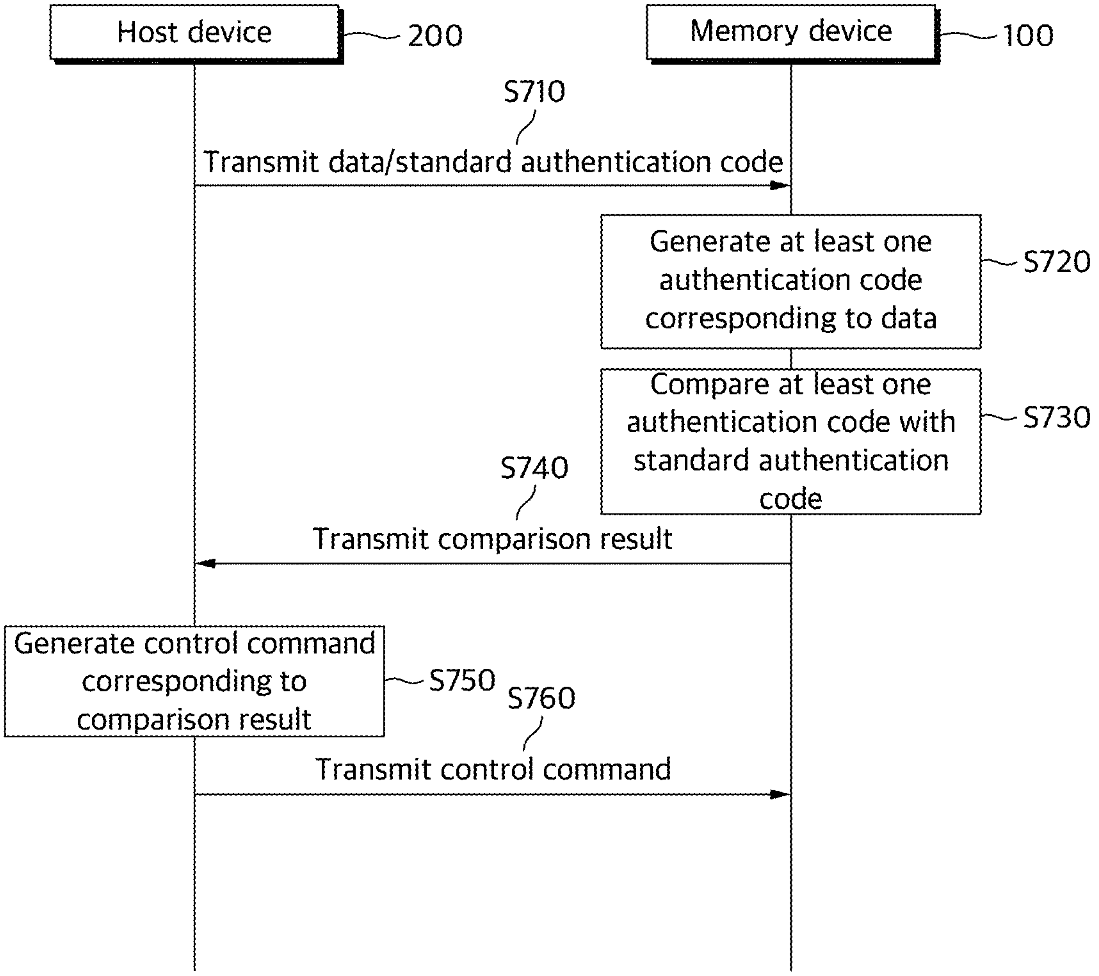
FIG. 7 is an operational flowchart for explaining an operating method of a memory device and a host device according to an example embodiment.

FIG. 7 is an operational flowchart for explaining an operating method of a memory device and a host device according to an example embodiment.

According to an example embodiment, the memory device 100 and the host device 200 may perform the operations disclosed in FIG. 7. For example, components included in the memory device 100 (for example, at least some of the memory block 130 and the processor 140 of FIG. 1) may be configured to perform the operations of FIG. 7.

In the following example embodiments, operations S710, S720, S730, S740, S750 and S760 may be performed sequentially, but the operations are not necessarily performed sequentially. For example, the order of each operation may be changed, and at least two operations may be performed in parallel. Further, any content that corresponds to or overlaps with the above-described content with respect to FIG. 7 may be briefly explained or omitted.

According to an example embodiment, the host device 200 may transmit the data and the standard authentication code to the memory device 100 in operation S710.

For example, the host device 200 may transmit the data to the memory device 100 for storage in the memory device 100.

For example, the host device 200 may further transmit a standard authentication code corresponding to the data to the memory device 100. The host device 200 may generate the standard authentication code based on at least one of the data, a hash key, and a count value with respect to the number of times of data storage. For example, the standard authentication code may include the storage address within the memory block 130 where the host device 200 wishes to store data, and identification information.

According to an example embodiment, the memory device 100 may generate at least one authentication code corresponding to the data in operation S720.

For example, the memory device 100 may generate at least one authentication code using at least one processing device.

For example, to at least one processing device, the memory device 100 may input at least one of the data, the hash key, and the count value with respect to the number of times of data storage received from the host device 200. The memory device 100 may identify or generate at least one authentication code that is output from at least one processing device.

For example, the memory device 100 may identify or generate at least one authentication code at different timepoints. For example, the memory device 100 may identify or generate the first comparison authentication code using the first processing device at the first timepoint based on the first delay value, and identify or generate the second comparison authentication code using the second processing device at the second timepoint based on the second delay value.

According to an example embodiment, the memory device 100 may compare at least one authentication code with the standard authentication code in operation S730.

For example, the memory device 100 may identify the first comparison result between the first comparison authentication code and the standard authentication code, and the second comparison result between the second comparison authentication code and the standard authentication code.

For example, the memory device 100 may identify at least one comparison result at different timepoints. The memory device 100 may identify the first comparison result at the third timepoint after the first timepoint, and identify the second comparison result at the fourth timepoint after the second timepoint. The difference between the first timepoint and the third timepoint and the difference between the second timepoint and the fourth timepoint may be substantially equal.

According to an example embodiment, the memory device 100 may transmit the comparison result to the host device 200 in operation S740.

For example, the memory device 100 may transmit the comparison results between authentication codes including the first comparison result and the second comparison result to the host device 200.

For example, the comparison result may be one of the first information to the third information described with reference to FIG. 5C described above.

According to an example embodiment, the host device 200 may generate a control command corresponding to the comparison result in operation S750.

For example, when both the first comparison result and the second comparison result satisfy the designated standard, the host device 200 may generate a control command that controls the memory device 100 to store the data in the memory block 130.

For example, when both the first comparison result and the second comparison result do not satisfy the designated standard, the host device 200 may generate a control command to control the memory device 100 not to store the data in the memory block 130.

For example, when either the first comparison result or the second comparison result does not satisfy the designated standard, the host device 200 may generate a control command that causes the memory device 100 to perform a response policy in response to authentication error.

According to an example embodiment, the host device 200 may transmit the control command to the memory device 100 in operation S760.

For example, the memory device 100 may perform an operation corresponding to the control command obtained from the host device 200.

For example, the memory device 100 may perform an operation corresponding to the control command and then transmit information about the completion of the operation to the host device 200.

The electronic device according to the above-described example embodiments may include a processor, a memory for storing and executing program data, a permanent storage such as a disk drive, and/or a user interface device such as a communication port, a touch panel, a key and/or a button that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processer.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

While the inventive concept has been particularly shown and described with reference to embodiments thereof, it will be understood that various changes in form and details may be made therein without departing from the spirit and scope of the present invention as set forth in the following claims.

What is claimed is:

1. A memory device comprising:
a memory block; and
a processor configured to:
identify data received from an external host,
identify a standard authentication code corresponding to the data and the standard authentication code being received from the external host,
generate a first comparison authentication code corresponding to the data using a hash key,
generate a second comparison authentication code corresponding to the data using the hash key at a different time than the first comparison authentication code, and
identify whether to store the data in the memory block based on at least one of the first comparison authentication code and the second comparison authentication code, and the standard authentication code.

2. The memory device of claim 1, wherein the processor is configured to:
determine a first timepoint when a time corresponding to a first delay value has elapsed from a timepoint at which the data or the standard authentication code is identified, and
determine a second timepoint when a time corresponding to a second delay value has elapsed from the timepoint at which the data or the standard authentication code is identified.

3. The memory device of claim 2, wherein the processor is configured to:

determine a range of the first and second delay values based on an operating performance of the memory device, and determine the first delay value and the second delay value within the range.

4. The memory device of claim 2, wherein the processor is configured to:

generate the first comparison authentication code at the first timepoint based on the first delay value, and generate the second comparison authentication code at the second timepoint based on the second delay value.

5. The memory device of claim 4, wherein the processor is configured to:

identify a first comparison result between the first comparison authentication code and the standard authentication code at a third timepoint that is after the first timepoint, and identify a second comparison result between the second comparison authentication code and the standard authentication code at a fourth timepoint that is after the second timepoint, and wherein the third timepoint is different from the fourth timepoint.

6. The memory device of claim 2, wherein the processor is configured to:

identify additional data received from the external host, identify an additional standard authentication code corresponding to the additional data, and the additional standard authentication code received from the external host, generate a third comparison authentication code corresponding to the additional data using the hash key, determine a third timepoint when a time corresponding to a third delay value has elapsed from a timepoint at which the additional data or the additional standard authentication code is identified, generate a fourth comparison authentication code corresponding to the additional data using the hash key, determine a fourth timepoint when a time corresponding to a fourth delay value has elapsed from the timepoint at which the additional data or the additional standard authentication code is identified, and identify whether to store the additional data in the memory block based on at least one of the third comparison authentication code and the fourth comparison authentication code, and the additional standard authentication code, and wherein at least one of the third delay value and the fourth delay value is different from the first delay value and the second delay value.

7. The memory device of claim 1, wherein the processor is configured to identify each of the first comparison authentication code and the second comparison authentication code including a storage address and identification information of the data based on at least one of the data, the hash key, and a count value of the number of times of data storage.

8. The memory device of claim 1, wherein the processor is configured to store the data in the memory block when a first comparison result between the first comparison authentication code and the standard authentication code and a second comparison result between the first comparison authentication code and the standard authentication code satisfy a designated standard.

9. The memory device of claim 1, wherein the processor is configured not to store the data in the memory block when a first comparison result between the first comparison authentication code and the standard authentication code and a second comparison result between the first comparison authentication code and the standard authentication code do not satisfy a designated standard.

10. The memory device of claim 1, wherein the processor is configured to perform a response policy regarding authentication error when either a first comparison result between the first comparison authentication code and the standard authentication code or a second comparison result between the first comparison authentication code and the standard authentication code satisfies a designated standard.

11. The memory device of claim 10, wherein the processor is configured to suspend an operation of the memory device or initialize the memory device by performing the response policy.

12. The memory device of claim 10, wherein the processor is configured to:

identify additional data received from the external host, identify an additional standard authentication code corresponding to the additional data, and the additional standard authentication code received from the external host, generate at least one additional comparison authentication code corresponding to the additional data based on identifying that either the first comparison result or the second comparison result satisfies the designated standard, determine a third timepoint when a time corresponding to at least one additional delay value has elapsed from a timepoint at which the additional data or the additional standard authentication code is identified, and identify whether to store the additional data in the memory block based on the at least one additional comparison authentication code and the additional standard authentication code.

13. A method of managing data performed by a memory device, the method comprising:

identifying data received from an external host;

identifying a standard authentication code corresponding to the data and the standard authentication code being received from the external host;

generating a first comparison authentication code corresponding to the data using a hash key;

generating a second comparison authentication code corresponding to the data using the hash key at a different time than the first comparison authentication code; and identifying whether to store the data in a memory block of the memory device based on at least one of the first comparison authentication code and the second comparison authentication code, and the standard authentication code.

14. The method of claim 13, further comprising:

determining a first timepoint when a time corresponding to a first delay value has elapsed from a timepoint at which the data or the standard authentication code is identified; and determining a second timepoint when a time corresponding to a second delay value has elapsed from the timepoint at which the data or the standard authentication code is identified.

15. The method of claim 14, further comprising:

determining a range of the first and second delay values based on an operating performance of the memory device; and determining the first delay value and the second delay value within the range.

16. The method of claim 15, further comprising:

performing a response policy regarding authentication error when either a first comparison result between the first comparison authentication code and the standard authentication code or a second comparison result between the first comparison authentication code and the standard authentication code satisfies a designated standard.

17. The method of claim 14, further comprising:

generating the first comparison authentication code at the first timepoint corresponding to the first delay value; and generating the second comparison authentication code at the second timepoint corresponding to the second delay value.

18. The method of claim 17, further comprising:

identifying a first comparison result between the first comparison authentication code and the standard authentication code at a third timepoint that is after the first timepoint; and identifying a second comparison result between the second comparison authentication code and the standard authentication code at a fourth timepoint that is after the second timepoint, wherein the third timepoint is different from the fourth timepoint.

19. The method of claim 13, further comprising:

storing the data in the memory block when a first comparison result between the first comparison authentication code and the standard authentication code and a second comparison result between the first comparison authentication code and the standard authentication code satisfies a designated standard.

20. A memory device comprising:

a counter;

a first processing device and a second processing device;

a first comparison device and a second comparison device;

a memory block; and a processor configured to:

identify data received from an external host, identify a standard authentication code corresponding to the data and the standard authentication code being received from the external host, determine a first timepoint when a time corresponding to a first delay value has elapsed from a timepoint at which the data or the standard authentication code is identified, determine a second timepoint when a time corresponding to a second delay value has elapsed from the timepoint at which the data or the standard authentication code is identified, generate a first comparison authentication code corresponding to the data at the first timepoint based on the first delay value using the first processing device, generate a second comparison authentication code corresponding to the data at the second timepoint based on the second delay value using the second processing device, identify a first comparison result between the first comparison authentication code and the standard authentication code at a third timepoint that is after the first timepoint using the first comparison device, identify a second comparison result between the second comparison authentication code and the standard authentication code at a fourth timepoint that is after the second timepoint using the second comparison device, and identify whether to store the data in the memory block based on the first comparison result and the first comparison result, and wherein the first comparison authentication code and the second comparison authentication code are generated based on at least one of the data, a hash key and a count value of the number of times of data storage that is identified by the counter.

* * * * *